(12) United States Patent
Freedman et al.

(10) Patent No.: US 10,604,946 B2
(45) Date of Patent: *Mar. 31, 2020

(54) METHOD OF MANUFACTURING AN ACOUSTICAL FLOORING TILE

(71) Applicant: MICHAEL FREEDMAN & ASSOCIATES, INC., Edison, NJ (US)

(72) Inventors: Michael Freedman, Morganville, NJ (US); Dale Tucker, Atlanta, GA (US)

(73) Assignee: MICHAEL FREEDMAN & ASSOCIATES, INC., Edison, NJ (US)

( * ) Notice: Subject to any disclaimer, the term of this patent is extended or adjusted under 35 U.S.C. 154(b) by 136 days.

This patent is subject to a terminal disclaimer.

(21) Appl. No.: 15/695,204

(22) Filed: Sep. 5, 2017

(65) Prior Publication Data

US 2017/0362839 A1    Dec. 21, 2017

Related U.S. Application Data

(63) Continuation of application No. 14/108,754, filed on Dec. 17, 2013, and a continuation-in-part of
(Continued)

(51) Int. Cl.
*E04F 15/00* (2006.01)
*B29D 99/00* (2010.01)
(Continued)

(52) U.S. Cl.
CPC .......... *E04F 15/206* (2013.01); *E04F 15/105* (2013.01); *E04F 15/107* (2013.01);
(Continued)

(58) Field of Classification Search
CPC . E04F 2290/043; E04F 15/206; E04F 15/105; E04F 15/107; B29D 99/0057;
(Continued)

(56) References Cited

U.S. PATENT DOCUMENTS

| 2,336,235 A | 12/1943 | Fischer et al. |
| 3,593,939 A | 7/1971 | Bolles et al. |

(Continued)

FOREIGN PATENT DOCUMENTS

| CN | 102747613 B | 10/2015 |
| DE | 4028475 A1 | 3/1992 |

(Continued)

OTHER PUBLICATIONS

NPL on elastomers and rubbers from Dow, obtained from http://www.dowcorning.com/content/discover/triviadiffelastrubber.aspx, retrieved on May 1, 2017.

(Continued)

*Primary Examiner* — Linda L Gray

(57) ABSTRACT

An acoustical vinyl tile having an integral acoustical layer is disclosed. The vinyl tile includes a vinyl portion and an acoustical portion. The acoustical portion may comprise a crumb rubber component and a polyurethane foam component. The acoustical portion can include 10-40% crumb rubber and 60-90% polyurethane foam. The acoustical portion may comprise a plurality of individual layers, the combination of which is customized to the particular subfloor structure to which the tile will be adhered or overlain. The individual layers of the acoustical portion can include any of a variety of combinations of rubber, cork, polyurethane foam, and the like. The resulting tile meets one or more of ASTM E 2179, ASTM E 989, ASTM E 492, and ASTM E1007 IIC sound requirements. A method of designing the disclosed tile to suit a particular flooring application is also disclosed. Other embodiments are described and claimed.

12 Claims, 13 Drawing Sheets

Related U.S. Application Data application No. 13/468,103, filed on May 10, 2012, now Pat. No. 8,640,824.

(60) Provisional application No. 61/808,670, filed on Apr. 5, 2013.

(51) Int. Cl.

| | | |
|---|---|---|
| *B32B 27/00* | (2006.01) | |
| *B32B 37/00* | (2006.01) | |
| *E04F 15/20* | (2006.01) | |
| *E04F 15/10* | (2006.01) | |
| *B32B 37/18* | (2006.01) | |
| *B32B 27/06* | (2006.01) | |
| *B32B 27/30* | (2006.01) | |
| *B32B 27/08* | (2006.01) | |

(52) U.S. Cl.
CPC ........ *B29D 99/0057* (2013.01); *B32B 27/065* (2013.01); *B32B 27/08* (2013.01); *B32B 27/30* (2013.01); *B32B 37/182* (2013.01); *E04F 2290/043* (2013.01); *Y10T 428/2495* (2015.01); *Y10T 428/249992* (2015.04); *Y10T 428/3167* (2015.04); *Y10T 428/31935* (2015.04)

(58) Field of Classification Search
CPC ..... B32B 37/182; B32B 27/065; B32B 27/08; B32B 27/30; Y10T 156/1062; Y10T 428/2495; Y10T 428/249992; Y10T 428/3167; Y10T 428/31935
See application file for complete search history.

(56) References Cited

U.S. PATENT DOCUMENTS

| | | |
|---|---|---|
| 3,770,536 A | 11/1973 | Haigh |
| 3,865,059 A | 2/1975 | Jackson |
| 3,895,143 A | 7/1975 | Tarlow |
| 3,975,562 A | 8/1976 | Madebach et al. |
| 4,056,161 A | 11/1977 | Allen, Jr. |
| 4,123,313 A | 10/1978 | Queen et al. |
| 4,128,523 A | 12/1978 | Britton et al. |
| 4,405,668 A | 9/1983 | Wald |
| 4,415,616 A | 11/1983 | Angioletti |
| 4,457,120 A | 7/1984 | Takata |
| 4,923,759 A | 5/1990 | Brooks et al. |
| 4,942,072 A | 7/1990 | Chung |
| 4,945,697 A | 8/1990 | Ott et al. |
| 4,994,130 A | 2/1991 | Ichikawa et al. |
| 5,011,719 A | 4/1991 | Gehrke et al. |
| 5,013,379 A | 5/1991 | Brooks et al. |
| 5,123,988 A | 6/1992 | Iwasa |
| 5,493,081 A | 2/1996 | Manigold |
| 5,885,693 A | 3/1999 | Eder et al. |
| 5,906,889 A | 5/1999 | Miron |
| 5,950,378 A | 9/1999 | Council et al. |
| 6,063,320 A | 5/2000 | Horikawa |
| 6,312,786 B1 | 11/2001 | Schwinn |
| 6,332,941 B1 | 12/2001 | Council et al. |
| 6,397,544 B1 | 6/2002 | Desai |
| 6,472,041 B1 | 10/2002 | Burke |
| 6,497,954 B1 | 12/2002 | Morin et al. |
| 6,576,577 B1 | 6/2003 | Garner |
| 6,623,840 B2 | 9/2003 | Hainbach |
| 6,709,729 B2 | 3/2004 | Baruch |
| 6,808,588 B1 | 10/2004 | Streeton et al. |
| 6,920,723 B2 | 7/2005 | Downey |
| 6,921,566 B2 | 7/2005 | Lipstein |
| 6,972,144 B2 | 12/2005 | Roth et al. |
| 7,029,744 B2 | 4/2006 | Horstman et al. |
| 7,431,975 B2 | 10/2008 | Zafiroglu |
| 7,735,279 B2 | 6/2010 | Paradis et al. |
| RE41,945 E | 11/2010 | Downey |
| 7,846,282 B2 | 12/2010 | Nishio et al. |
| 7,993,717 B2 | 8/2011 | OConnor |
| 8,113,495 B2 | 2/2012 | Downey |
| 8,151,933 B2 | 4/2012 | May et al. |
| 8,181,580 B2 | 5/2012 | Roth et al. |
| 8,192,823 B2 | 6/2012 | Hainbach |
| 8,205,391 B2 | 6/2012 | Aritake et al. |
| 8,240,430 B2 | 8/2012 | Downey |
| 8,287,978 B2 | 10/2012 | Kornfalt et al. |
| 8,287,979 B2 | 10/2012 | Kornfalt et al. |
| 8,397,456 B2 | 3/2013 | Ruhdorfer |
| 8,530,034 B2 | 9/2013 | Khan et al. |
| 8,640,824 B2 | 2/2014 | Freedman et al. |
| 8,728,260 B2 | 5/2014 | Dodge, III et al. |
| 8,893,850 B2 * | 11/2014 | Freedman ............ E04F 15/105 181/284 |
| 9,096,045 B2 | 8/2015 | Dodge, III et al. |
| 9,174,565 B2 | 11/2015 | Dodge, III |
| 9,289,085 B2 | 3/2016 | Thrush |
| 9,290,951 B2 | 3/2016 | Moriau et al. |
| 9,327,482 B2 | 5/2016 | Feng et al. |
| 9,340,970 B2 | 5/2016 | Dodge, III et al. |
| 9,528,276 B2 | 12/2016 | Pervan |
| 9,567,753 B2 | 2/2017 | Pervan et al. |
| 9,695,601 B2 | 7/2017 | Whispell et al. |
| 10,029,447 B2 | 7/2018 | Dodge et al. |
| 2003/0033779 A1 | 2/2003 | Downey |
| 2003/0203152 A1 | 10/2003 | Higgins et al. |
| 2004/0001933 A1 | 1/2004 | Eberhard |
| 2004/0069924 A1 | 4/2004 | Lemieux et al. |
| 2004/0076841 A1 | 4/2004 | Sauer et al. |
| 2004/0241370 A1 | 12/2004 | Cline et al. |
| 2006/0037815 A1 | 2/2006 | Schabel |
| 2006/0105136 A1 | 5/2006 | Brazier et al. |
| 2006/0130416 A1 | 6/2006 | Mohr et al. |
| 2006/0156663 A1 | 7/2006 | Mao |
| 2006/0199453 A1 | 9/2006 | Kuhn et al. |
| 2007/0014960 A1 | 1/2007 | Emanuel et al. |
| 2007/0026216 A1 | 2/2007 | Weingartner et al. |
| 2007/0077398 A1 | 4/2007 | Aguilera et al. |
| 2007/0137927 A1 | 6/2007 | Ducharme |
| 2007/0254131 A1 | 11/2007 | Shail et al. |
| 2007/0275207 A1 | 11/2007 | Higgins et al. |
| 2008/0010930 A1 | 1/2008 | Mao |
| 2008/0029337 A1 | 2/2008 | Alston |
| 2008/0104914 A1 | 5/2008 | Lemieux |
| 2008/0182074 A1 | 7/2008 | Pasquale et al. |
| 2008/0261004 A1 | 10/2008 | Higgins et al. |
| 2009/0029097 A1 | 1/2009 | Riddle et al. |
| 2009/0032163 A1 | 2/2009 | Dodge |
| 2009/0226662 A1 | 9/2009 | Dyczko-Riglin et al. |
| 2010/0007047 A1 | 1/2010 | Lau |
| 2010/0047520 A1 | 2/2010 | Drube et al. |
| 2010/0106464 A1 | 4/2010 | Hlasny et al. |
| 2010/0108439 A1 | 5/2010 | Seo |
| 2010/0288582 A1 | 11/2010 | May et al. |
| 2010/0319282 A1 | 12/2010 | Ruland |
| 2011/0067336 A1 | 3/2011 | McDonald et al. |
| 2011/0074128 A1 | 3/2011 | Chang |
| 2011/0167744 A1 | 7/2011 | Whispell et al. |
| 2011/0173924 A1 | 7/2011 | Ambrose, Jr. et al. |
| 2011/0189410 A1 | 8/2011 | Dodge |
| 2012/0023850 A1 | 2/2012 | Sich |
| 2012/0167370 A1 | 7/2012 | Kuepfer et al. |
| 2012/0189819 A1 | 7/2012 | Chang |
| 2012/0276348 A1 | 11/2012 | Clausi et al. |
| 2012/0325403 A1 | 12/2012 | Chereau et al. |
| 2013/0230687 A1 | 9/2013 | Chen |
| 2013/0327590 A1 | 12/2013 | Grube et al. |
| 2014/0030503 A1 | 1/2014 | Wright |
| 2015/0147564 A1 | 5/2015 | Dodge, III et al. |
| 2016/0361901 A1 | 12/2016 | Dodge, III et al. |

FOREIGN PATENT DOCUMENTS

| | | |
|---|---|---|
| DE | 102008003153 A1 | 7/2009 |
| EP | 0206329 A2 | 12/1986 |
| EP | 0281354 A2 | 9/1988 |

(56) References Cited

FOREIGN PATENT DOCUMENTS

| EP | 0301773 | A2 | 2/1989 |
|---|---|---|---|
| EP | 1001111 | A2 | 5/2000 |
| FR | 2308487 | A1 | 11/1976 |
| GB | 2300593 | A | 11/1996 |
| JP | 09151596 | A | 6/1997 |
| JP | 3893508 | B2 | 3/2007 |
| JP | 4461121 | B2 | 5/2010 |
| WO | 199641844 | A1 | 12/1996 |
| WO | 199950513 | A1 | 10/1999 |
| WO | 2006127837 | A1 | 11/2006 |
| WO | 2008087672 | A1 | 7/2008 |
| WO | 2008154009 | A1 | 12/2008 |
| WO | 2009155190 | A2 | 12/2009 |
| WO | 2012045343 | A1 | 4/2012 |

OTHER PUBLICATIONS

Dictionary entry of the term Cork from Oxford, a Dictionary of Ecology, retrieved on May 1, 2017.

International Search Report and Written Opinion dated Aug. 22, 2014, from corresponding PCT/US2014/031413, filed Mar. 21, 2014 (eleven (11) sheets).

Extended Search Report dated Oct. 23, 2015, from corresponding European Patent Application No. EP 13165658.9 (eight (8) sheets).

ECOsurtaces Commercial Flooring & LEED, published Jan. 2009, 12 pages.

\* cited by examiner

METHOD OF MANUFACTURING AN ACOUSTICAL FLOORING TILE

CROSS-REFERENCE TO RELATED APPLICATIONS

This is a continuation application of pending U.S. patent application Ser. No. 14/108,754, which is a non-provisional of U.S. Provisional Patent Application Ser. No. 61/808,670, filed Apr. 5, 2013, and which is also a continuation-in-part of U.S. Non-Provisional patent application Ser. No. 13/468,103, filed May 10, 2012, now U.S. Pat. No. 8,640,824, the entirety of which applications are expressly incorporated by reference herein.

FIELD OF THE DISCLOSURE

The present disclosure relates to vinyl flooring systems in general, and more particularly to an improved vinyl tile having enhanced acoustical properties coupled with improved long term stability.

BACKGROUND OF THE DISCLOSURE

Vinyl flooring has been a popular floor covering material for many years. Vinyl flooring is typically available in either tile or sheet form for both commercial and residential use. As finished flooring material, vinyl tile has been used extensively in commercial, institutional and public building applications, such as, for example, malls, schools, healthcare facilities, convention and exposition centers, civic buildings, private office buildings, sports facilities, and so forth. Vinyl flooring is durable, easy to maintain and is often more moisture-resistant than many alternative flooring materials. Vinyl flooring can also have limited acoustical properties, in that the material offers some rebound or resilience upon compression (i.e., when walked on).

Vinyl tiles can be composed of colored vinyl formed into generally planar solid sheets by heat and pressure, and cut into squares or other shapes. Manufacturers have created vinyl tiles that very closely resemble wood, stone, terrazzo, and concrete. Tiles are typically applied to a smooth, leveled bare floor or sub-floor usually using a suitable adhesive.

Conventional vinyl tiles are often installed over an acoustical base layer such as rubber or cork. The acoustical layer can serve one or more of a variety of different functions in a given installation. In some installations, the function of this underlayment material is to provide a cushioning effect to the floor system. In other situations, the function of the underlayment material is to compensate for imperfections in the surface of the subfloor, which can be concrete, plywood, or a number of other different materials that are commonly used and known. Another function of the underlayment, which is particularly pertinent to the present invention, is to reduce the transmission of sound through the floor to a room below, such as in the case of a multi-floor building. This is particularly significant where the maximum allowable level of sound transmission is controlled by local building codes, which is increasingly common.

In such cases, a single acoustical base layer is adhered to the sub-floor, and the vinyl tiles are installed over the acoustical base layer, again using an adhesive.

Many conventional commercially available adhesive materials are chemically incompatible with vinyl polymers and will in some instances not provide the necessary long-term adhesion. In even more extreme cases, certain adhesives will chemically react with the vinyl polymers resulting in discoloration and/or degradation of the vinyl tiles. Moreover, breakdown of the adhesive bond between the acoustical base layer and the vinyl tile can lead to increased noise, which as previously noted, can be a problem in multi-family dwellings.

The base layer and vinyl tiles are standard elements that are used without regard for the particular sub-floor structure upon which the sub-floor is laid.

Different building structures can transmit sound differently, depending upon the materials of construction as well as the construction arrangement (e.g., wooden floor/ceiling beams, poured concrete, and the like). Because current vinyl tile systems employ a standard base layer, they are incapable of dampening sound optimally across a variety of floor/ceiling structure types. For example, while a typical tile may provide reasonable acoustical dampening when applied over a poured concrete floor, it may not provide acceptable dampening when applied over a wood beam-supported floor.

Thus, there is a need for an improved vinyl tile having improved long term stability as compared to conventional vinyl tiles and vinyl flooring systems. The improved vinyl tile should also provide a desired resilience, with exceptional sound dampening properties that meet applicable acoustical limitations associated with multi-family dwellings. The improved vinyl tile should also be easy to manufacture and install. These and a number of additional objectives are met by the disclosed vinyl tile.

SUMMARY OF THE DISCLOSURE

In view of the aforementioned deficiencies in the prior art, an improved vinyl tile system is disclosed whose structure can be customized to provide a desired acoustical dampening for any of a variety of different flooring structures. The improved vinyl tile system includes sound dampening properties that meet applicable acoustical limitations associated with multi-family dwellings. The improved vinyl tile also provides a desired resilience, and is easy to manufacture and install. These and a number of additional objectives are met by the disclosed vinyl tile.

The disclosed system and method include an improved vinyl tile having enhanced stability, resilience and acoustical properties. The disclosed vinyl tile may incorporate a durable bond between the vinyl and acoustical material layers to ensure long term stability and performance. Some embodiments of the disclosed vinyl tile may also include an anti-fungal compound mixed with some or all of the tile raw materials to inhibit growth of fungus.

Alternatively, the disclosed vinyl tile may incorporate an acoustical layer made up of a plurality of individual sublayers. The composition and arrangement of the sublayers can be adjusted to provide desired sound dampening properties that are customized to a particular flooring structure.

In some embodiments, a sound dampening material is bonded to a vinyl tile slab prior to cutting the product into tiles or planks. The formulation of the acoustical sound dampening material may be selected to be compatible with the adhesive used to fix the material to the vinyl tile slab. Such a formulation may ensure a good long term bond between the sound dampening material and the vinyl tile slab. The acoustical sound dampening material may also be selected to be compatible with the vinyl tile slab material, which may reduce or eliminate discoloration of the vinyl tile over the lifetime of the flooring system. Embodiments of the disclose tile incorporate the aforementioned chemical compatibility while still providing desired acoustical properties. The disclosed vinyl tiles may find application in multi-family housing developments, which as previously noted can benefit greatly from the associated sound dampening properties.

A vinyl tile is disclosed. In one embodiment, the vinyl tile includes a vinyl portion, an acoustical portion, and an adhesive layer for fixing the vinyl portion to the acoustical portion. The acoustical portion comprises a crumb rubber component and a polyurethane foam component. In some embodiments, the acoustical portion comprises 10-40% crumb rubber and 60-90% polyurethane foam. The acoustical portion may further comprise a resin binder. The vinyl portion may comprise polyvinylchloride.

The vinyl tile may further include a wear layer disposed on a surface of the vinyl portion. The vinyl portion may comprise a vinyl backing layer, a print layer and a clear wear layer. The vinyl backing layer, the print layer and the clear wear layer are bonded together via hot mold compression.

A vinyl tile is disclosed. The vinyl tile includes a vinyl portion, and an acoustical portion comprising a crumb rubber portion, a polyurethane foam portion, and a resin binder. A polyurethane adhesive layer may be interposed between the vinyl portion and the acoustical portion. The acoustical portion may comprise 10-40% crumb rubber and 60-90% polyurethane foam. In some embodiments, the vinyl portion comprises polyvinylchloride. A wear layer may be disposed on a surface of the vinyl portion. The vinyl portion may comprise a vinyl backing layer, a print layer and a clear wear layer. The vinyl backing layer, the print layer and the clear wear layer may be bonded together via hot mold compression.

A method of making a vinyl tile is disclosed. The method may include: providing a vinyl slab portion; providing an acoustical slab portion comprising crumb rubber, polyurethane foam and a resin binder; and bonding the vinyl slab portion to the acoustical portion. Providing a vinyl slab portion may comprise stacking a vinyl backing layer, a print film layer, and a clear wear layer on top of a moldboard and molding the layers together using a hot press. Providing an acoustical slab portion may comprise mixing the crumb rubber, the polyurethane foam and the resin binder; curing the mixture; cooling the cured mixture to form a cooled roll; and cutting a layer from the cooled roll.

The method may also include coating the vinyl slab portion with a polyurethane layer. Bonding the vinyl slab portion to the acoustical portion may comprise applying a polyurethane adhesive to a surface of the acoustical slab portion; applying the vinyl slab portion to the adhesive coated surface of the acoustical slab portion; and applying force to the acoustical slab portion and the vinyl slab portion for a predetermined time. The method may also include pressing the bonded vinyl slab portion and the acoustical slab portion in a press having die, the die cutting the slab into vinyl tiles of a predetermined shape and size. In some embodiments, the vinyl slab portion may comprise polyvinylchloride.

In an alternate embodiment, the vinyl tile may include a vinyl portion and an acoustical portion comprising a plurality of individual sub-layers. First and second sub-layers of the plurality individual sub-layers may comprise material compositions that are different from each other. The first and second sub-layers have thicknesses that are different from each other. The first and second sub-layers may have thicknesses that are the same. The first sub-layer may comprise rubber and the second sub-layer may comprise rubber and cork. The first sub-layer may comprise rubber and cork and the second sub-layer may comprise rubber. In some embodiments, the plurality of individual sub-layers includes three individual sub-layers. The at least three individual sub-layers may each comprise a material composition that is different from the other individual sub-layers. In other embodiments, the plurality of individual sub-layers comprise greater than three individual sub-layers.

A method is disclosed for designing a vinyl tile to suit a particular flooring application. The method may include: determining a type of a sub-floor system that includes the floor/ceiling assembly to which a vinyl tile will be applied; selecting an acoustical portion of said vinyl tile to include "n" sub-layers, where "n" is a number greater than 1 and is based on the type of said sub-floor; and selecting a material composition for each of said "n" sub-layers, where the material composition for each of said "n" sub-layers is based on the type of said sub-floor and the number "n" of sub-layers. The method may also include selecting a thickness of each of the "n" sub-layers based on the type of said sub-floor system that includes the floor/ceiling assembly, the number "n" of sub-layers and the material of each of the sub-layers. The method may further include bonding the "n" individual sub-layers together to form said acoustical portion. The method may also include bonding the acoustical portion to a vinyl tile portion of said vinyl tile. The method may also include applying the vinyl tile to the sub-floor.

BRIEF DESCRIPTION OF THE DRAWINGS

By way of example, a specific embodiment of the disclosed vinyl tile will now be described, with reference to the accompanying drawings, in which.

DETAILED DESCRIPTION

The disclosed vinyl tile comprises a vinyl layer with an integrated sound reducing underlayment permanently attached thereto. The resulting floor/ceiling assembly including the tile meets one or more of ASTM E 2179, ASTM E 989, ASTM E 492, and ASTM E1007 IIC sound requirements. The disclosed vinyl tile also eliminates the two-step installation process associated with prior vinyl tile flooring systems which require installing an underlayment to the subfloor using a first adhesive, then installing the vinyl tile over the underlayment using a second adhesive. The disclosed tile thus reduces the total time required for installation. Alternatively, the disclosed vinyl tile includes a customizable sound reducing underlayment (referred to as an "acoustical layer" or "acoustical portion") that is selected for the particular sub-floor system that includes the floor/ceiling assembly design with this which the tile will be used. The disclosed tile thus provides a desired level of sound dampening that is not achievable with prior standard tiles. The acoustical layer includes a plurality of sub-layers that can be formulated from different materials, and provided in different thicknesses, to provide superior sound dampening characteristics based on the associated sub-floor system that includes the floor/ceiling assembly design. In some embodiments, the disclosed vinyl tile includes recycled content (e.g., a combined 60% recycled content). In other embodiments, the disclosed vinyl tile includes an antifungal compound to inhibit the growth of fungus.

Figure 1:
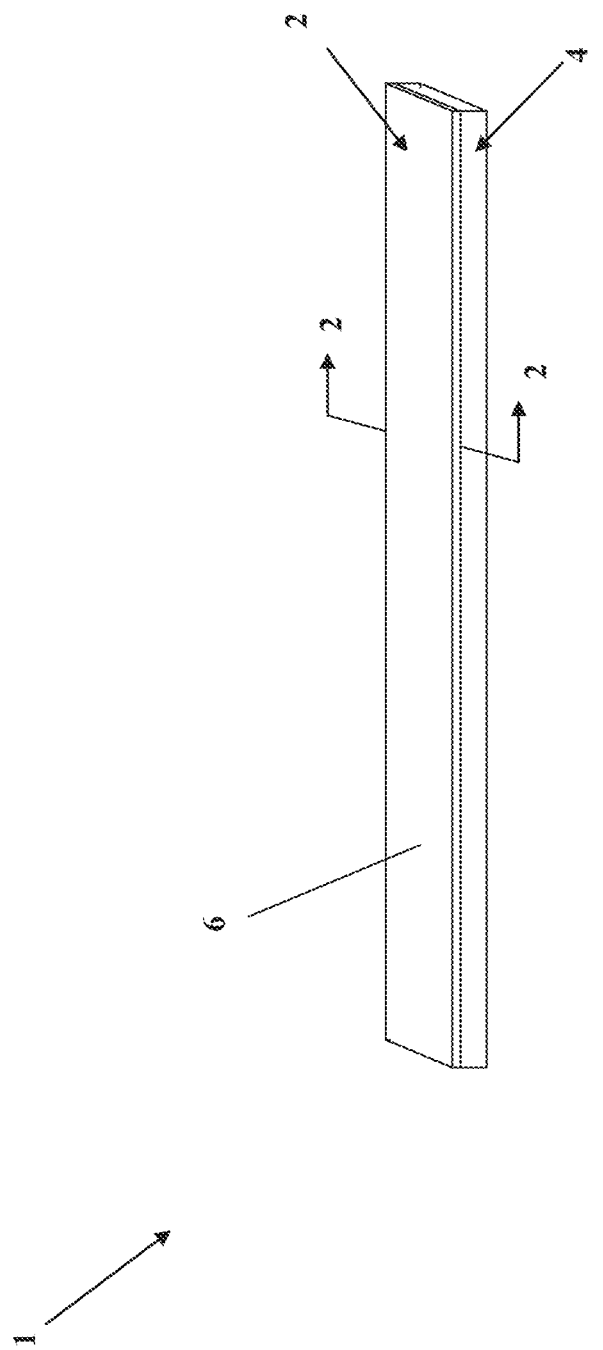
FIG. 1 is an isometric view of an embodiment of an exemplary vinyl tile according to the disclosure.

Referring now to FIG. 1, an exemplary vinyl tile 1 includes an upper vinyl portion 2 and a lower acoustical portion 4. The vinyl tile 1 is shown as having a rectangular plank shaped. It will be appreciated, however, that it can be manufactured in any of a variety of desired geometric and non-geometric shapes. Non-limiting examples of such shapes include rectangular planks with a width of 4-inches and a length of 36-inches, rectangular planks with a width of 6-inches and a length of 36-inches, and 18-inch by 18-inch square shapes.

The vinyl portion may include a surface wear layer 6 to enhance the wear life of the vinyl portion 2. The surface wear layer 6 may have a thickness of about 0.005-inches (5 mils) to about 30 mils. In one embodiment, the surface wear layer may be about 8 mils. The surface wear layer 6 may comprise polyvinyl chloride (PVC). In one non-limiting exemplary embodiment, the surface wear layer 6 includes at least 90% PVC.

The vinyl portion 2 may comprise a polyvinylchloride (PVC) material, while the acoustical portion 4 may comprise a combination of crumb rubber and polyurethane. The inventor has found that incorporating polyurethane into the acoustical layer, in combination with the crumb rubber component, enhances compatibility between the acoustical portion 4 and the vinyl portion 4. In one non-limiting exemplary embodiment, the acoustical portion comprises about 10-40% crumb rubber, about 60-90% polyurethane foam, and a resin binder. In some embodiments, the crumb rubber component is obtained from recycled tires or sneaker rubber. The polyurethane foam may be an appropriate open cell or closed cell foam. The resin binder may be a polyurethane binder.

Figure 2:
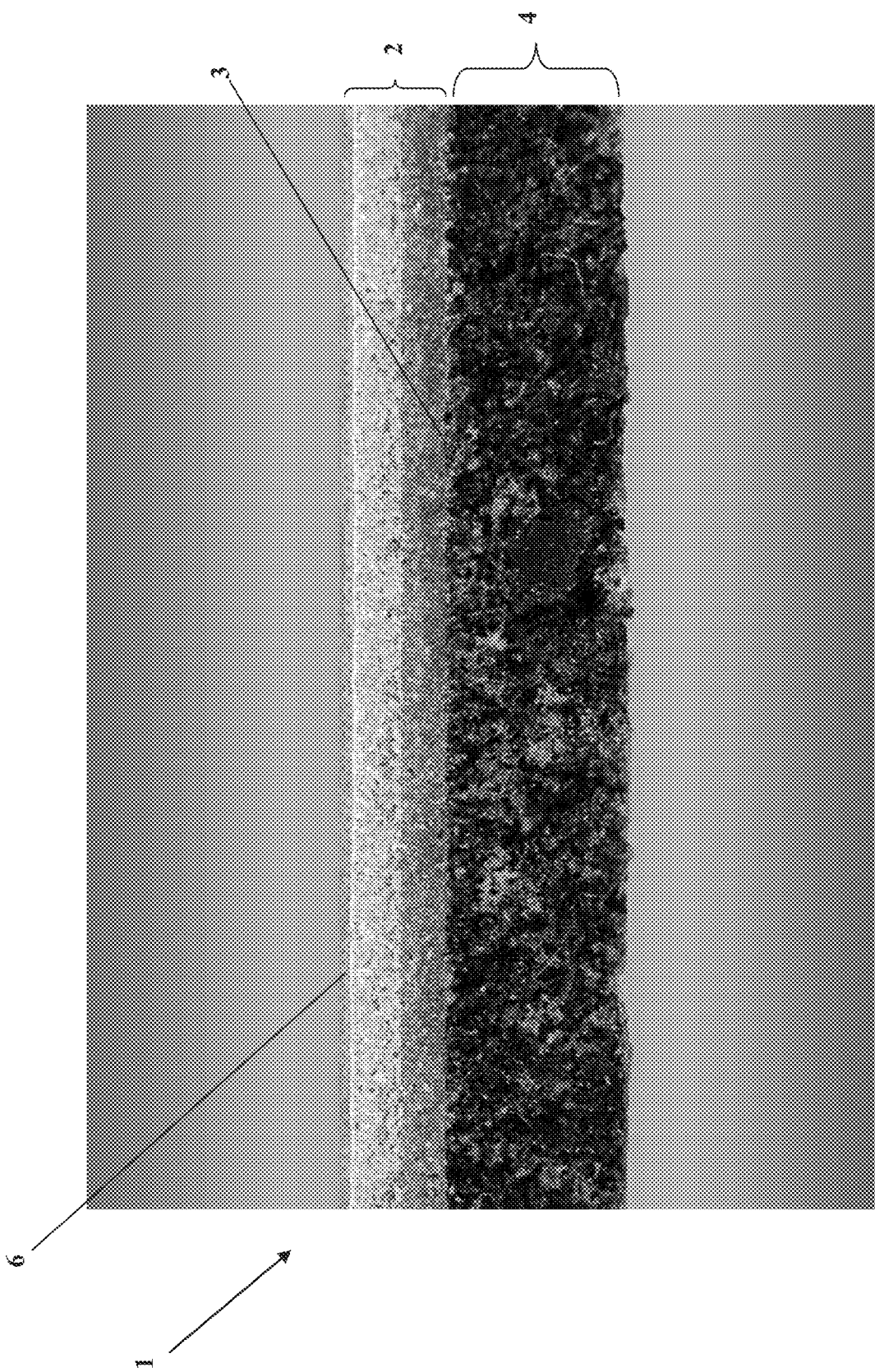
FIG. 2 is a cross-section view of the vinyl tile of FIG. 1.

FIG. 2 shows a cross-section of the vinyl tile 1 including vinyl portion 2, adhesive layer 3, acoustical portion 4 and surface wear layer 6. In one embodiment, the vinyl portion 2 has a thickness of about 2 millimeters (mm), the acoustical portion 4 may have a thickness of about 3 mm, and the surface wear layer may be about 0.008 inches or about 0.012 inches. In other embodiments, the vinyl portion 2 has a thickness of about 3 millimeters (mm), while the acoustical portion 4 may have a thickness of about 3 mm, and the surface wear layer 6 may be about 0.022 inches. These thicknesses are not critical, and other thicknesses may be selected for each portion. As will be described in greater detail later, the acoustical portion 4 is permanently bonded to the vinyl portion 2 using an adhesive that is highly compatible both with the vinyl portion 2 and the acoustical portion 4. Moreover, the acoustical portion 4 may also be highly compatible with the vinyl portion to reduce the chances for delamination and/or degradation of the vinyl portion 2 from the acoustical portion 4 during use. The total thickness of the resulting vinyl tile 1 may be about 5 mm (0.20-inch) and may develop an IIC in accordance with ASTM E 2179 of greater than 52.

Figure 3:
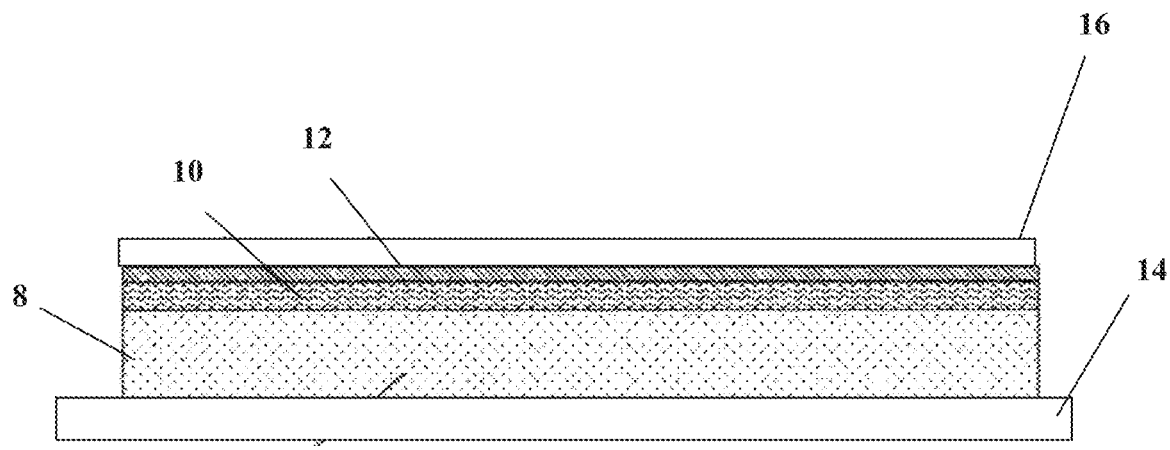
FIG. 3 is an exemplary stack-up of layers in a portion of the vinyl tile of FIG. 1.
Figure 4:
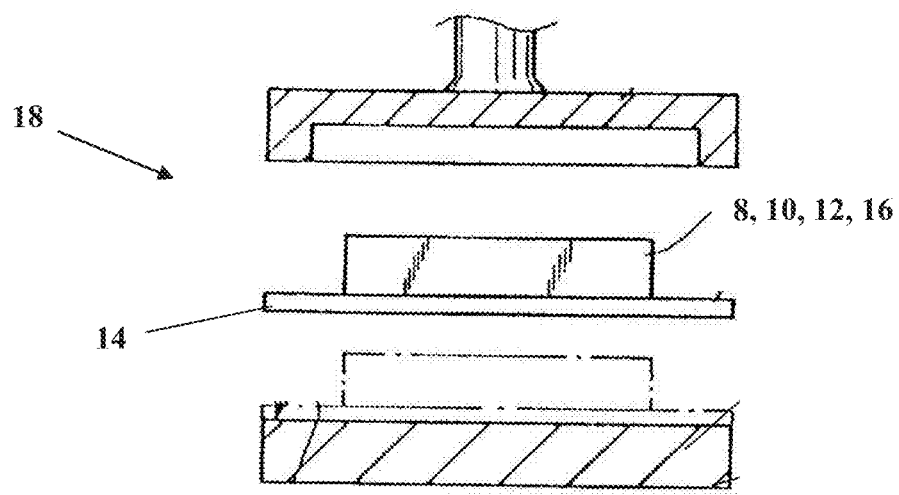
FIG. 4 is a schematic of a molding apparatus for forming a portion of the vinyl tile of FIG. 1.
Figure 5:
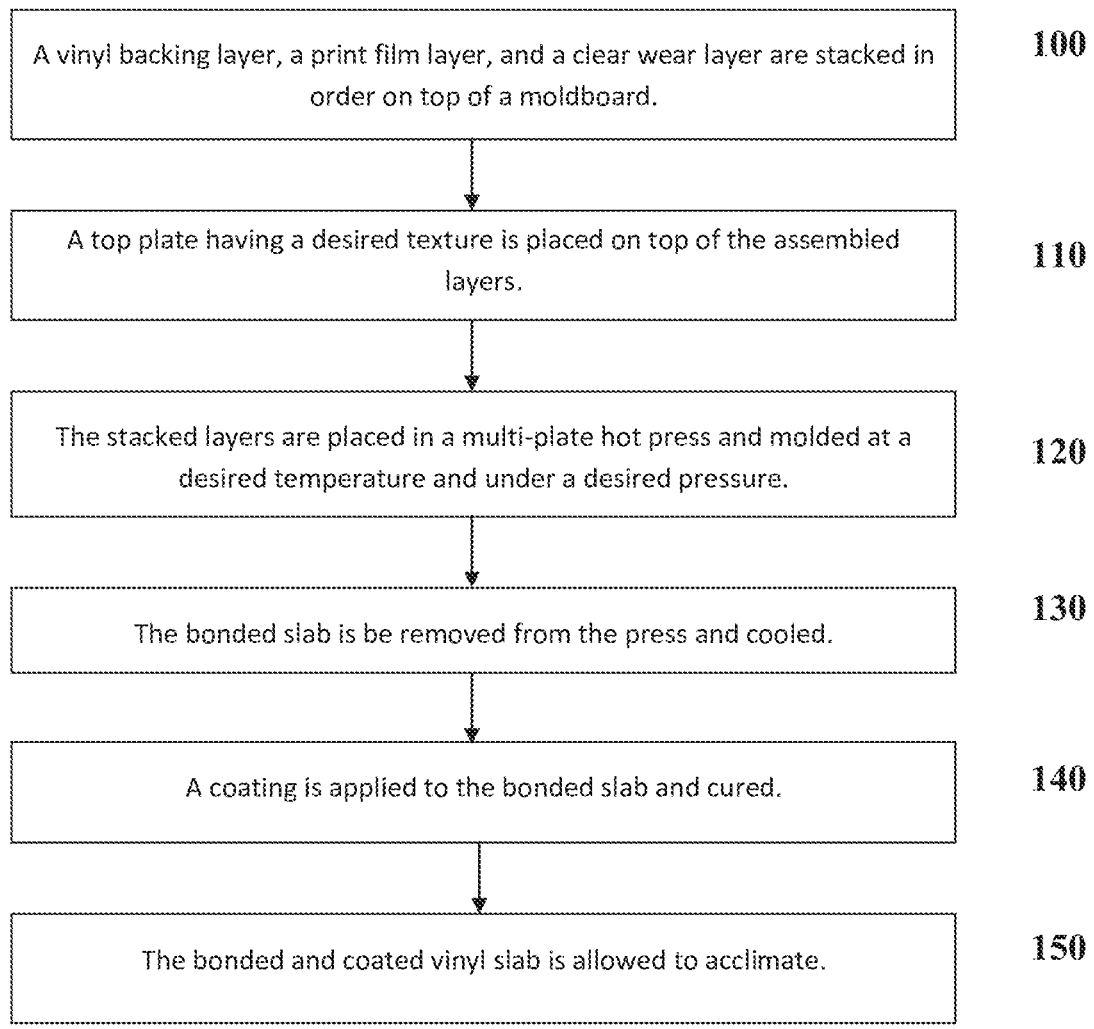
FIG. 5 is a flow chart illustrating an exemplary method of manufacturing the vinyl tile of FIG. 1.
Figure 6:
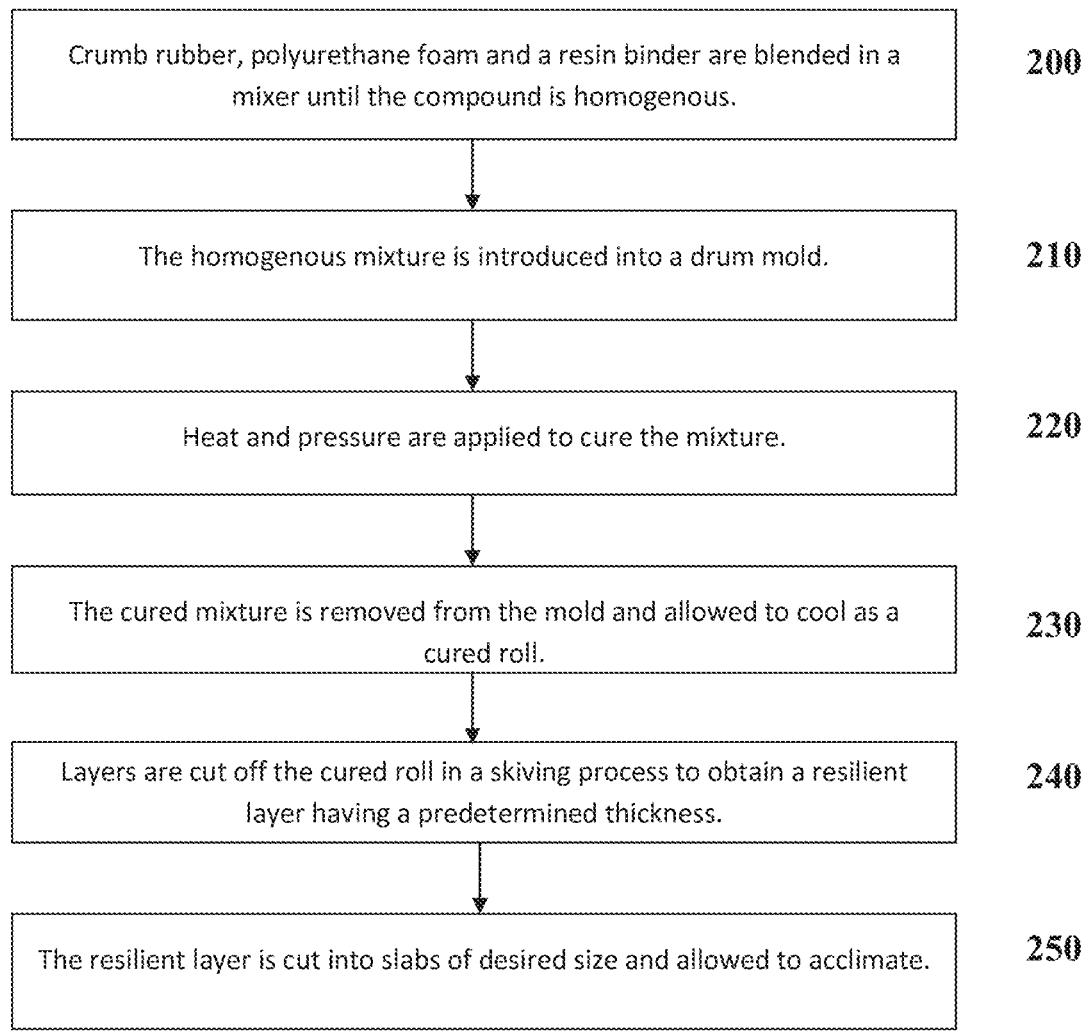
FIG. 6 is a flow chart illustrating an exemplary method of manufacturing the vinyl tile of FIG. 1.
Figure 7:
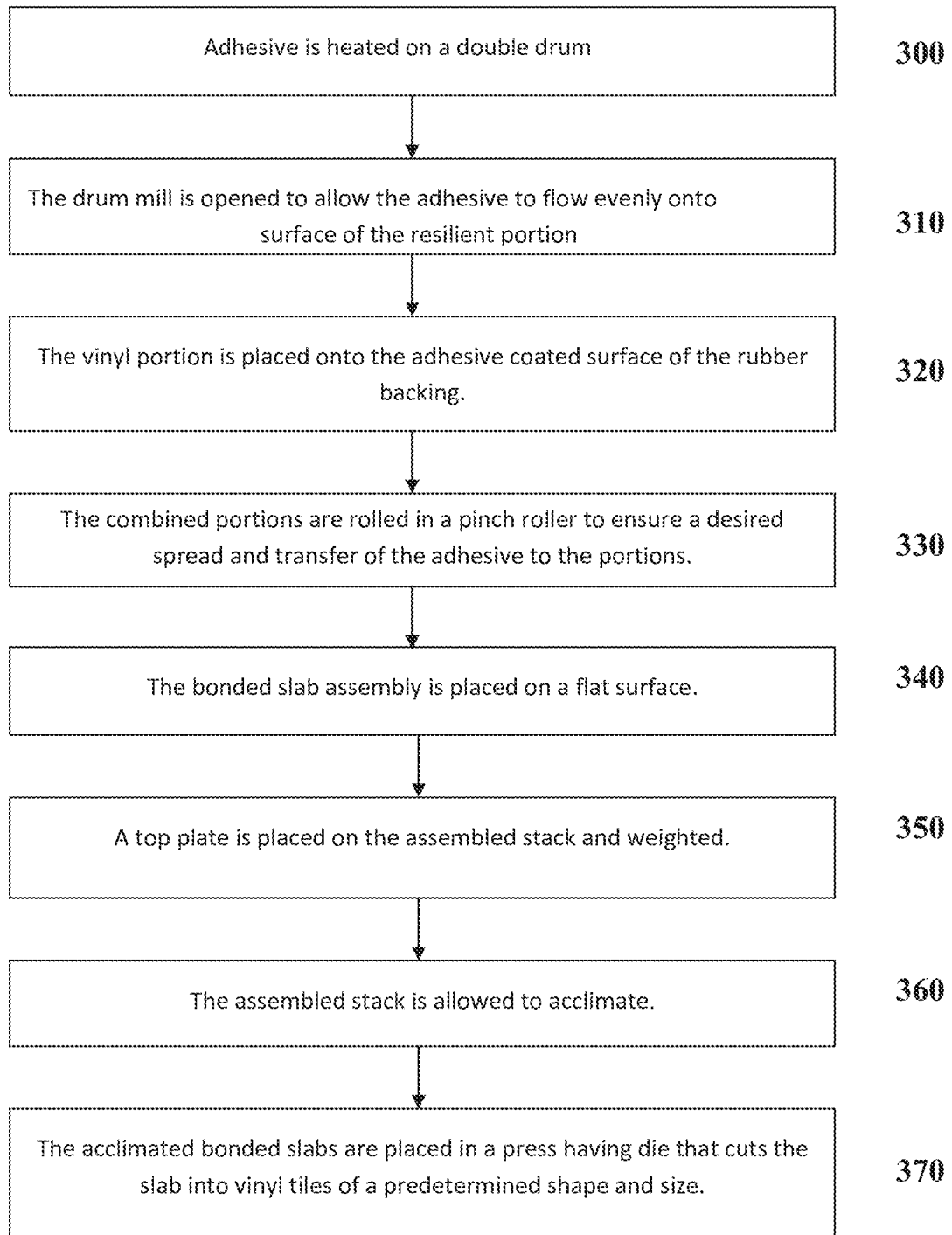
FIG. 7 is a flow chart illustrating an exemplary method of manufacturing the vinyl tile of FIG. 1.

A method for manufacturing the exemplary vinyl tile 1 will now be described in relation to FIGS. 3-7. The vinyl portion 2 may include a vinyl backing layer 8, a print film layer 10 applied over the backing layer, and a clear wear layer 12 applied over the print film layer 10 (FIG. 3). In one embodiment, the vinyl backing layer 8 is PVC, the print film layer is 10 and the clear wear layer 12 are PVC. At step 100 (FIG. 5), the layers 8, 10, 12 may be stacked in order on top of a moldboard 14. At step 110, a top plate 16 having a desired texture may be placed on top of the assembled layers. This process may be repeated as desired. At step 120 the assembled layers 8, 10, 12 may be placed in a multi-plate hot press 18 (FIG. 4) and molded at a desired temperature and under a desired pressure for a desired time. The temperature may be from about 175 degrees F. to about 325 degrees F. The pressure may be from about 250 psi to about 350 psi. The time may be from about 8 minutes to about 16 minutes. At step 130 the bonded slab may be removed from the press and cooled. At step 140 a polyurethane or other coating may then be applied to an upper surface of the vinyl portion 2 and cured with ultraviolet light or other appropriate curing technique. At step 150 the bonded and coated vinyl slab (now vinyl portion 2) may be allowed to acclimate at 68 degrees Fahrenheit (+/−5 degrees F.) for about 48 hours.

As previously noted, the acoustical portion 4 may comprise a crumb rubber component, a polyurethane foam component, and a resin binder. In one exemplary embodiment, the base acoustical material may be compounded to consist of 10 to 40 parts crumb rubber, 60 to 90 parts polyurethane foam and a resin binder. At step 200, the mixture may be blended in a mixer until the compound is homogenous. In some embodiments, the crumb rubber and polyurethane may be recycled from postindustrial or postconsumer materials. At step 210 (FIG. 6), the mixture may be introduced into a drum mold. At step 220, heat and pressure may be applied to cure the mixture. In some embodiments, the temperature may be up to about 450 degrees F., the pressure may be up to about 1,200 psi, and the curing time may be up to about 90 minutes. At step 230, the cured mixture may be removed from the mold and allowed to cool as a cured roll. At step 240 layers are cut off the cured roll in a skiving process to obtain an acoustical layer 4 having a thickness of about 0.118-in (3 mm). The acoustical layer 4 may then be cut into slabs of desired size and allowed to acclimate at 68 degrees F. (+/−5 degrees F.) for about 48 hours. The acoustical portion 4 may be stored in the same location as the vinyl portion 2 so that the portions acclimate together.

The vinyl portion 2 and acoustical portion 4 may then be bonded together using a suitable adhesive. At step 300 (FIG. 7), the adhesive may be heated on a double drum mill to allow the carrier to flash more quickly. In one embodiment, the adhesive is a polyurethane adhesive, which may prevent any reaction between the acoustical layer 4 and the vinyl portion 2. At step 310, the drum mill is opened to allow the adhesive to flow evenly onto an upper surface of the acoustical portion 4 as the acoustical portion 4 passes under the mill opening. To facilitate this, the acoustical portion 4 may be carried along on an open metal belt conveyer. At step 320, the vinyl portion 2 may be placed onto the adhesive coated surface of the rubber backing and, at step 330, the combined portions may be rolled in a pinch roller to ensure a desired spread and transfer of the adhesive to the adjoining surfaces of the portions 2, 4. In one embodiment, the pinch roller applies a pressure of about 150 psi to the combined portions. At step 340, the bonded slab assembly (containing bonded layers 2, 4) may then be placed on a flat surface. This process may be repeated until a desired quantity of bonded slab assemblies is produced or a maximum height of 38 inches is achieved. At step 350, a top plate may be placed on the assembled stack and weighted. At step 360, the assembled stack may be allowed to acclimate at 68 degrees F. (+/−5 degrees F.) for about 48 hours. This acclimation may allow the bonded assembly to equalize any stress in the material prior to cutting to size. This acclimation may also facilitate the dimensional stability of the finished product. At step 370 the acclimated bonded slabs may be inspected and placed in a press, which in one embodiment is a 150-ton clicker press. The press may have a die installed that cuts the slab into vinyl tiles 1 of a predetermined shape and size. Each cut vinyl tile may then be inspected visually for pattern and surface defects. The cut pieces can be placed on a smooth glass surface and inspected for gauge. The cut and inspected vinyl tiles 1 may then be packaged and stored for use.

Testing

Impact Sound Transmission Test and Classification was performed on an exemplary vinyl tile 1 installed over a wood joist floor/ceiling assembly. The specimen was tested in accordance with the American Society for Testing and Materials (ASTM) designation ASTM E492-09, titled "Standard Test Method for Laboratory Measurement of Impact Sound Transmission Through Floor-Ceiling Assemblies Using the Tapping Machine." It was classified in accordance with ASTM E989-06, entitled, "Standard Classification for Determination of Impact Insulation Class (IIC)".

This method measures the impact sound transmission performance of a floor/ceiling assembly, in a controlled laboratory environment. A standard tapping machine (B & K Type 3207) was placed at four positions on a test floor that forms the horizontal separation between two rooms, one directly above the other. The data obtained was normalized to a reference room absorption of 10 square meters in accordance with the test method.

The standard also prescribes a single-figure classification rating called "Impact Insulation Class, IIC" which can be used by architects, builders and code authorities for acoustical design purposes in building construction.

The IIC is obtained by matching a standard reference contour to the plotted normalized one third octave band sound pressure levels at each test frequency. The greater the IIC rating, the lower the impact sound transmission through the floor-ceiling assembly.

The test floor consisted of a 100-sq. ft. opening that forms the horizontal separation of the two rooms, one directly above the other. The structural members are open webbed wood floor trusses, 16 inches deep installed 24 inches on center. The sub flooring is ⅝-inch-thick plywood. The bridging is a continuous 2×4 nailed to the bottom chord and the sides of the diagonals with 2-inch-long nails. Single leaf RC-1 acoustical channels (2½ inch×½ inch) were spaced 16 inches on center and attached to the bottom chord by screws. The insulation is 5½ inches of fiberglass. The ceiling is gypsum board, ⅝ inches thick, with the long edges located between the joists perpendicular to the acoustical channels. Short edges are staggered by 4 ft. Sheets are fastened to the acoustical channels by means of ½ inch screws located ½ inch away from the edge and 3 inches from the long edges; screws are spaced 6 inches on center. Joints are taped and finished with two layers of compound.

The exemplary vinyl tile 1 measured 6 inches wide by 36 inches long by 0.20 inches thick. The flooring weighed 0.65 lbs/sq. ft.

Test Results

The data obtained in the room below the panel normalized to Ao=10 square meters, is as follows:

| 1/3 Octave Band Center Frequency Hz | 1/3 Octave Band Sound Pressure Level dB re 0.0002 Microbar |
|---|---|
| 100 | 66 |
| 125 | 60 |
| 160 | 60 |
| 200 | 62 |
| 250 | 63 |
| 315 | 61 |
| 400 | 60 |
| 500 | 56 |
| 630 | 49 |
| 800 | 40 |
| 1000 | 27 |
| 1250 | 22 |
| 1600 | 20 |
| 2000 | 18 |
| 2500 | 17 |
| 3150 | 13 |
| Impact Insulation Class (IIC) | 54 |

The 95% uncertainty level for each tapping machine location is less than 3 dB for the ⅓ octave bands centered in the range from 100 to 400 Hz and less than 2.5 dB for the bands centered in the range from 500 to 3150 Hz.

For the floor/ceiling construction, the 95% uncertainty limits for the normalized sound pressure levels were determined to be less than 2 dB for the ⅓ octave bands centered in the range from 100 to 3500.

Figure 8:
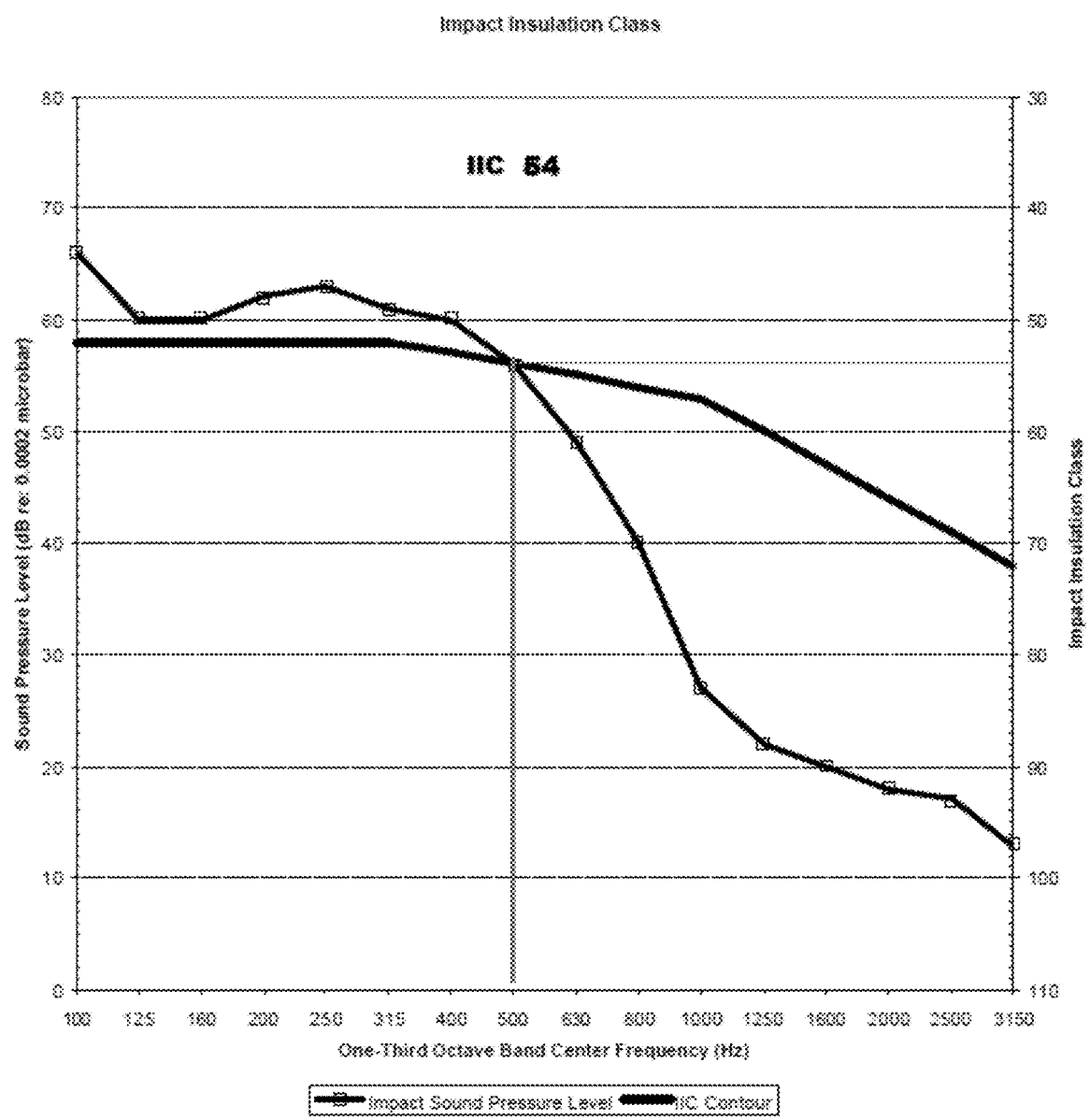
FIG. 8 is a graph showing impact sound pressure level measurements and ASTM 2179 IIC contour for the exemplary vinyl tile of FIG. 1.

FIG. 8 shows the results from testing in which impact sound pressure level and IIC contour are plotted for the exemplary vinyl tile 1. The generally accepted minimum passing limit for a floor ceiling assembly is an IIC of 50 or above. As can be seen, the exemplary vinyl tile 1 exhibited an IIC of 54.

Figure 9:
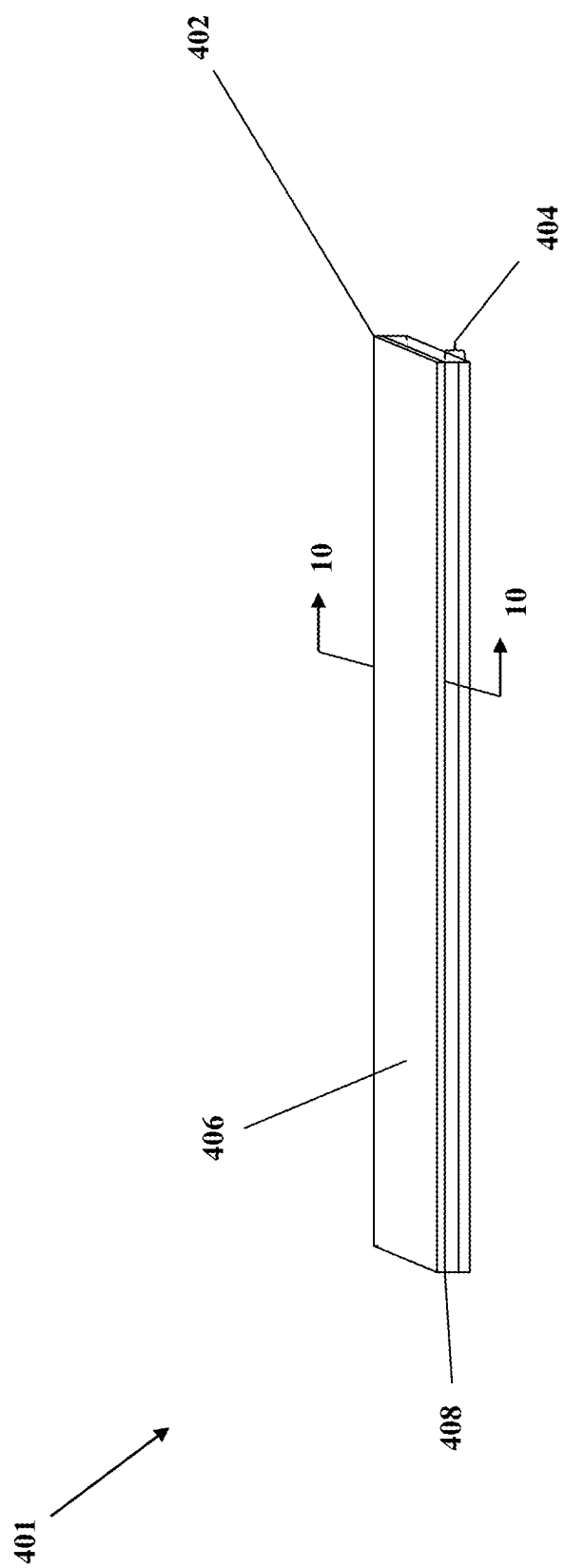
FIG. 9 is an isometric view of an alternative embodiment of an exemplary vinyl tile according to the disclosure.

Referring to FIG. 9, an exemplary vinyl tile 401 includes an upper vinyl portion 402 and a lower acoustical portion 404. Although the vinyl tile 401 is shown as having a rectangular plank shape, it will be appreciated that tiles according to the disclosure can be manufactured in any of a variety of desired geometric and non-geometric shapes. Non-limiting examples of such shapes include rectangular planks with a width of 4-inches and a length of 36-inches, rectangular planks with a width of 6-inches and a length of 36-inches, and 18-inch by 18-inch square shapes.

The vinyl portion 402 may include a surface wear layer 406 to enhance the wear life of the vinyl portion. The surface wear layer 406 may have a thickness of about 0.005-inches (5 mils) to about 40 mils. In one embodiment, the surface wear layer may be about 8 mils. The surface wear layer 406 may comprise polyvinyl chloride (PVC). In one non-limiting exemplary embodiment, the surface wear layer 406 includes at least 90% PVC. The vinyl portion 402 may comprise a polyvinylchloride (PVC) material. The acoustical portion 404 may comprise a plurality of layers including a variety of different sound dampening materials, as will be described in greater detail later. The vinyl portion 402 may be bonded to the acoustical portion 404 using a suitable adhesive 408.

Figure 10:
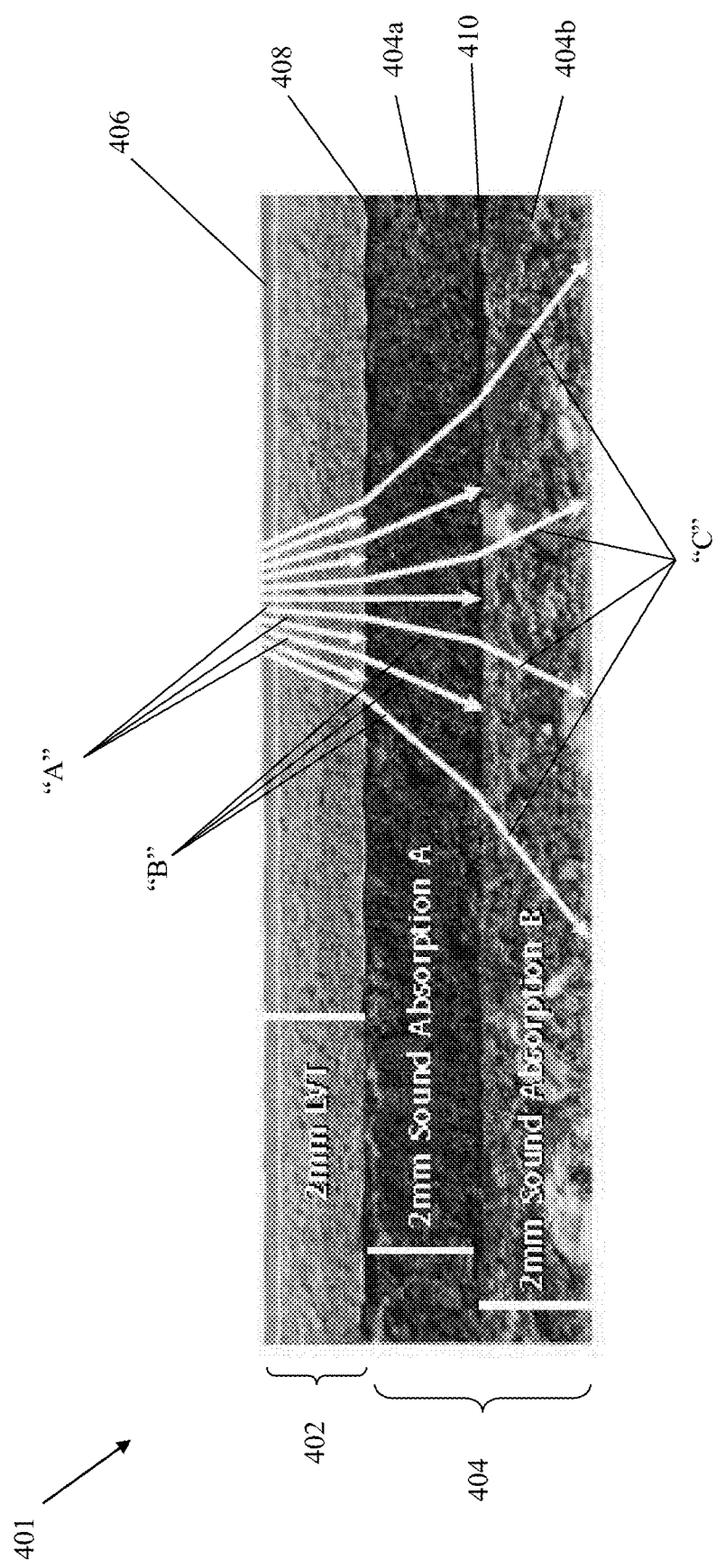
FIG. 10 is a cross-section view of the vinyl tile of FIG. 9.

FIG. 10 shows a cross-section of the vinyl tile 401. This exemplary embodiment includes a vinyl portion 402 (with surface wear layer 406) and an acoustical portion 404 that includes first and second sub-layers 404a, 404b. The vinyl portion 402 can be bonded to the first sub-layer 404a by adhesive layer 408, while the first and second sub-layers 404a, 404b can be bonded together by adhesive layer 410. It will be appreciated that in some embodiments the layers may be bonded to each other without adhesive, such as by heat bonding or the like.

The acoustical portion 404 (including its sub-layers) can be permanently bonded to the vinyl portion 402 using an adhesive layer 408 material that is highly compatible both with the vinyl portion 402 and the first sub-layer 404a. Likewise, the material making up the first sub-layer 404a may be highly compatible with the vinyl portion 402 to reduce the chances for de-lamination and/or degradation of the vinyl portion from the acoustical portion during extended use. The same may be true of the compatibility of the adhesive layer 410 and the first and second sub-layers 404a, b to ensure long term durability of the resulting tile 401.

In the illustrated embodiment, the vinyl portion 402 has a thickness of about 2 millimeters (mm), while the acoustical portion 404 has a combined thickness of about 4 mm. The sub-layers 404a, 404b are shown as having thicknesses of 2 mm each. It will be understood that these thicknesses are merely exemplary, and that different individual layer thicknesses can be used to suit a particular application, as will be explained.

As previously noted, it is desirable that the actual composition of layers within the tile 401 be variable so as to be customizable to the particular flooring application. That is to say that different sub-floor structures can require different combinations of acoustical portion sub-layer gauges, thicknesses and materials in order to achieve specific construction demands of a particular building. It will be appreciated that modern construction methods include the manufacture of buildings having concrete sub-flooring (six-inch concrete, light concrete, etc.), and a wide variety of different truss-based sub-floor systems (metal trusses, wooden trusses, and combinations thereof). In addition, a single building may include multiple different sub-floor types, each of which can have a different acoustical "response." As will be appreciated, in vinyl tiles 401 used with each of these different sub-flooring types may need to include a customized acoustical portion 404 in order to provide desired sound dampening in such buildings.

Thus, to accommodate these applications, the acoustical portion 404 may include a plurality of sub-layers 404a-404n of sound dampening material. Although the illustrated embodiments include two sub-layers (404a, 404b) it will be appreciated that more than two sub-layers (i.e., up to "n" sub-layers) as desired to suit the application. In addition, although the illustrated embodiments show individual sub-layers 404a, 404b having respective thicknesses of 2 mm, that other thicknesses may also be used. The individual materials used to form the sub-layers 404a-404n may be formulated to minimize sound impact transmissions at specific frequencies. Likewise, the thicknesses of the sub-layers 404a-404n may be selected to work in combination with the individual sub-layer material types to minimize sound impact transmissions at specific frequencies. By structuring the acoustical layers according to the particular type of sub-floor assembly, sound reduction can be fine-tuned for a particular structure.

As can be seen in FIG. 10, sound (represented by arrows "A") is transmitted through the vinyl portion 402. The sound (represented by arrows "B"7) is then transmitted through the first sub-layer 404a. The sound (represented by arrows "C") is finally transmitted through the second sub-layer 404b at a third frequency and magnitude. The resulting tile 401 meets ASTM E 2179 IIC sound requirements. As the sound moves through each layer 402, 404a, 404b, sound at various frequencies is reduced and absorbed.

A non-limiting exemplary listing of appropriate sub-layer materials include the following:
1) Rubber layers;
2) Rubber and cork formulated together;
3) Rubber and polyurethane (PU) foam formulated together;
4) PU Foam and cork formulated together; and the like.

The above, and other, materials can be provided in a variety of different densities, multiple thicknesses, and may include one or more fiber components.

Each of the sub-layers 404a-404n may have a thickness in the range of about 0.5 mm to about 5.5 mm. The thickness of the assembled layers (i.e., total thickness of the acoustical portion 404) may be between about 2.5 mm to about 6 mm. As previously noted, the number of sub-layers can be as few as two, but is not limited to several as the requirements are met for a particular need. The layers are bonded together with specific adhesives in various ways depending on the composition of the layers. A non-limiting exemplary listing of such adhesives includes cyanoacrylate, latex, acrylic, epoxy and the like.

In some embodiments, incorporating polyurethane into one or more of the sub-layers 404a-404n can enhance compatibility between the acoustical portion 404 and the vinyl portion 402. In one non-limiting exemplary embodiment, the acoustical portion comprises about 10-40% crumb rubber, about 60-90% polyurethane foam, and a resin binder. In some embodiments the crumb rubber component is obtained from recycled tires or sneaker rubber. The polyurethane foam may be an appropriate open cell or closed cell foam, while the resin binder may be a polyurethane binder.

Figure 11:
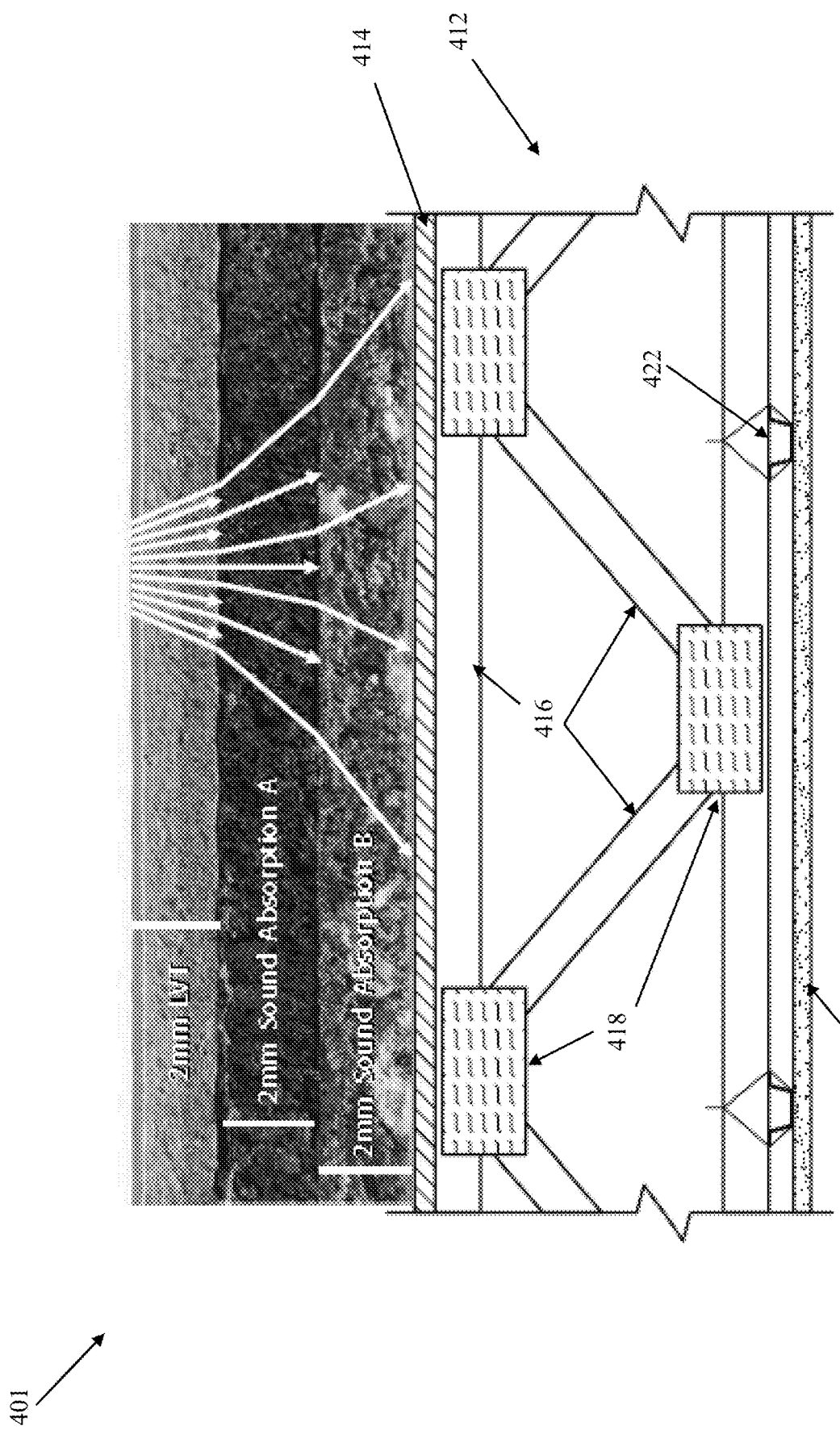
FIG. 11 shows the vinyl tile of FIG. 10 applied over a truss-based sub-floor.

As noted, different sub-floor systems that includes the floor/ceiling assembly structures transmit sound differently, and thus it can be desirable to customize the individual sub-layers 404a-404n of a vinyl tile 401 to suit the application. FIG. 11 shows the tile 401 of FIG. 10 applied over a wood truss sub-floor assembly 412. As can be seen, a wood truss sub-floor assembly 412 might be made of a variety of different burling materials, including plywood sheathing 414, wood beams 416, metal fastening plates 418, gypsum board 420 (where the sub-floor forms part of an adjoining ceiling, as in the illustrated embodiment), resilient channels 422, etc. As will be appreciated, wood trusses tend to deflect and require backings that take such flexure into account. Thus, in the FIG. 11 embodiment, the acoustical portion 404 includes a first sub-layer 404a comprising a rubber material, and a second sub-layer 404b comprising a combination of rubber and cork. Each of the sub-layers 404a, 404b of this embodiment are about 2 mm thick, and are adhered together using any of a variety of appropriate adhesives, as previously described.

Figure 12:
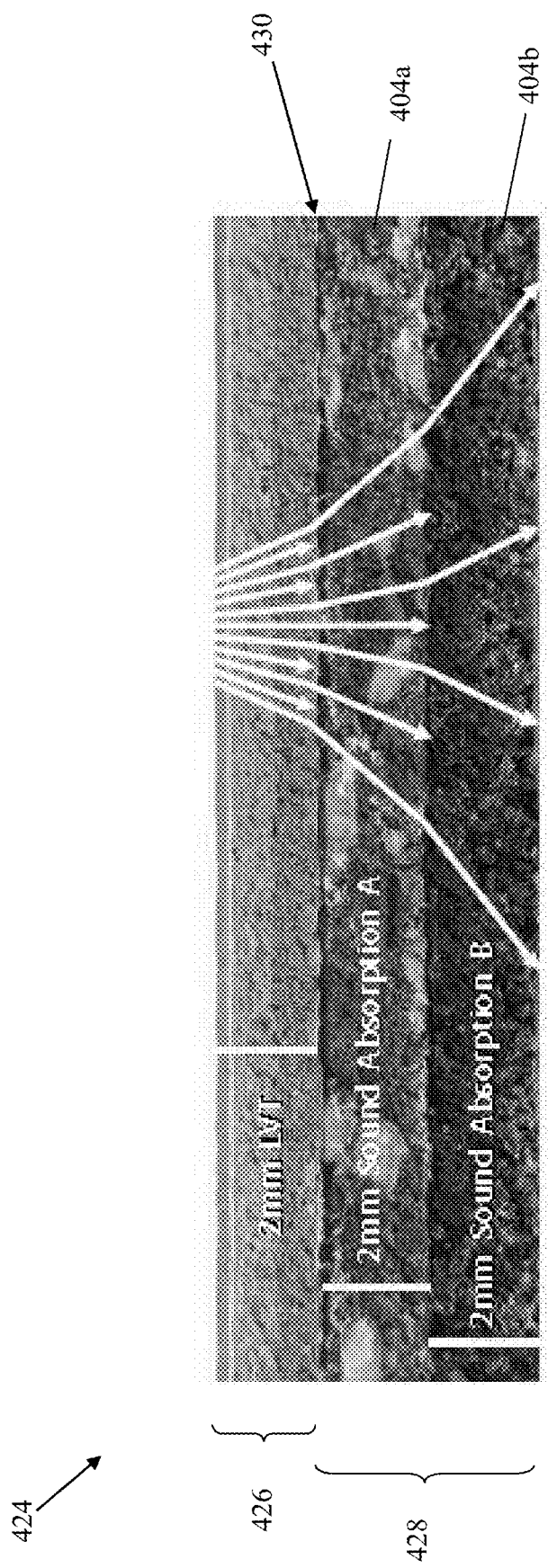
FIG. 12 is a cross-section view of an alternative exemplary vinyl tile according to the disclosure.
Figure 13:
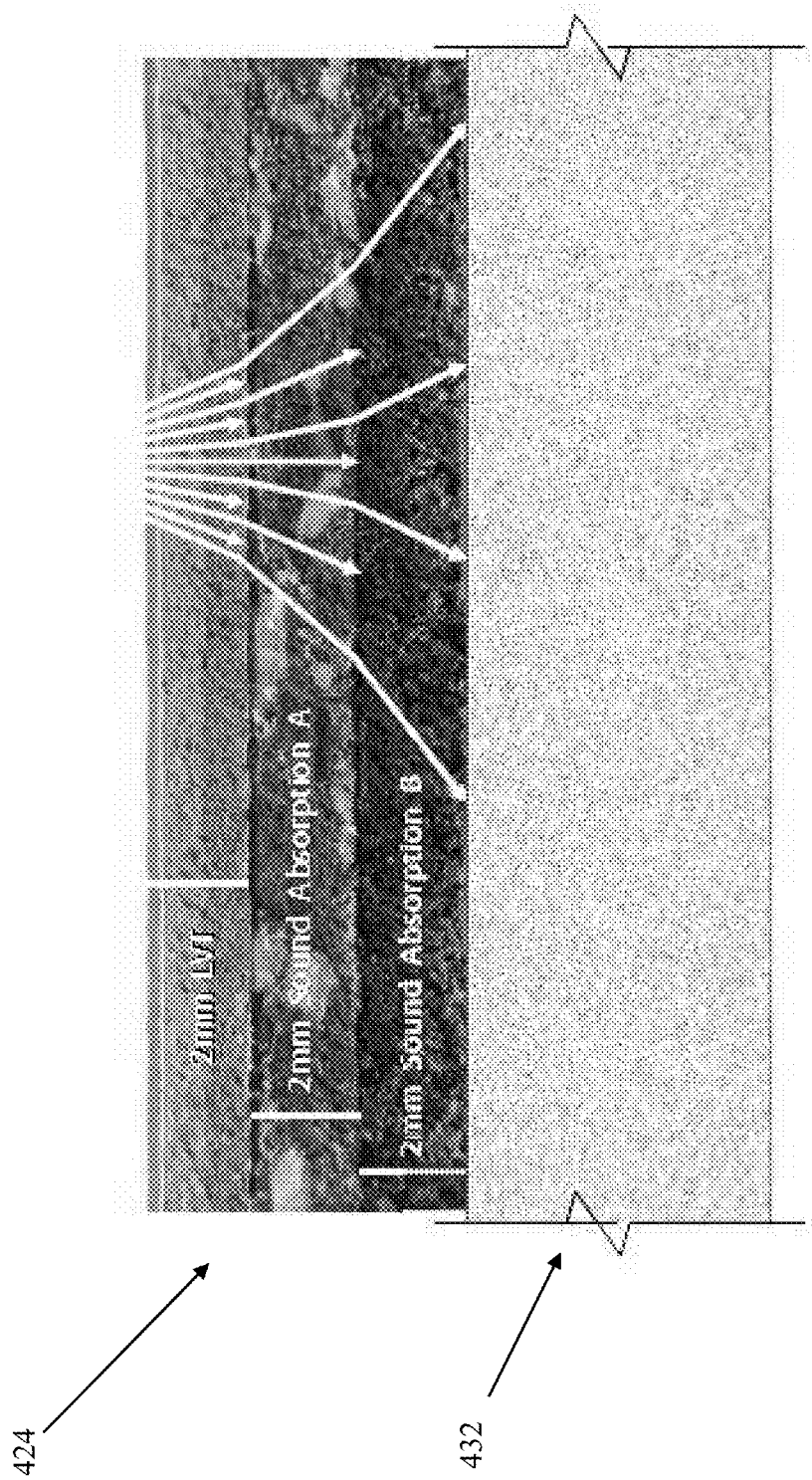
FIG. 13 shows the vinyl tile of FIG. 12 applied over a concrete sub-floor.

FIG. 12 shows an exemplary alternative floor tile 424 that includes a vinyl portion 426, and an acoustical portion 428 adhered thereto using an adhesive layer 430. In this embodiment, the acoustical portion 404 again includes first and second sub-layers 404a, 404b. By contrast to the prior embodiment, however, the first sub-layer 404a comprises a cork and rubber combination, while the second sub-layer 404b comprises a rubber layer. As shown in FIG. 13, this alternative tile may be appropriate for use with a concrete sub-floor 432. Since concrete is more homogenous and rigid than the previously described wooden truss floor assembly 412, it can transmit more sound at some frequencies than others.

Figure 14:
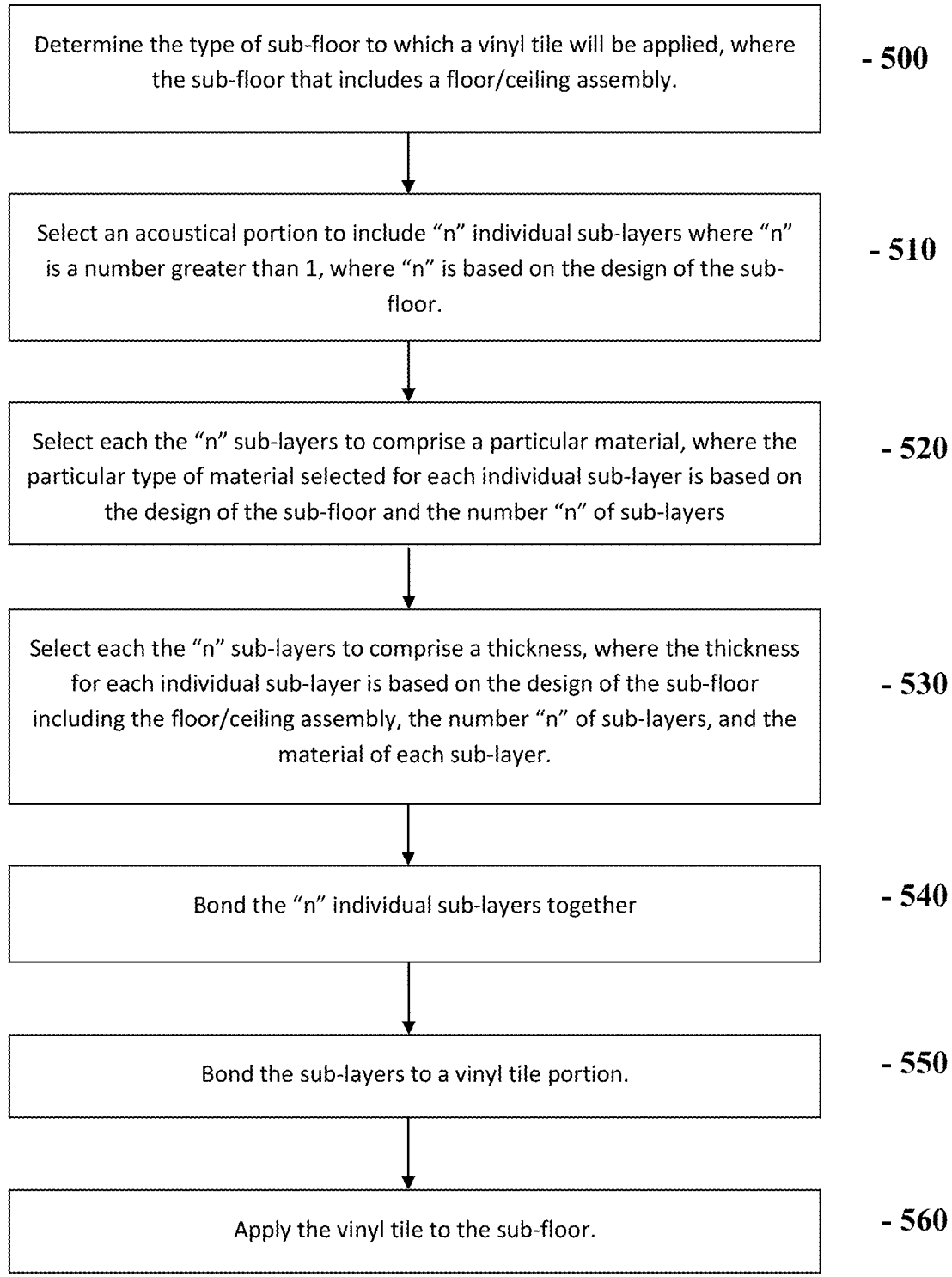
FIG. 14 is a logic diagram illustrating a method according to the disclosure.

Referring now to FIG. 14, a method for designing, manufacturing, and applying a vinyl tile 401 to suit a particular flooring application will now be described. At step 500, the design of a particular sub-floor system that includes the floor/ceiling assembly to which the vinyl tile 401 will be applied is determined. At step 510, an acoustical portion is designed to include "n" individual sub-layers where "n" is a number greater than 1. The number "n" of individual sub-layers is selected based on the design of the sub-floor. At step 520 each the "n" sub-layers are selected to comprise a particular material. The particular material selected for each individual sub-layer is based on the design of the sub-floor system that includes the floor/ceiling assembly and the number "n" of sub-layers. At step 530, each of the "n" sub-layers are selected to have a particular thickness, where the thickness of each sub-layer is selected based on the design of the sub-floor, the number "n" of sub-layers and the material of each of the sub-layers. At step 540, the "n" individual sub-layers are bonded together. At step 550, the bonded sub-layers are bonded to a vinyl tile portion. At step 560, the vinyl tile is applied to the sub-floor.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

The invention claimed is:

1. A method of manufacturing a vinyl tile, the method comprising:
   forming a vinyl slab portion;
   forming an acoustical portion;
   storing the vinyl slab portion and the acoustical portion in the same location for a first predetermined time period to allow the vinyl slab portion and the acoustical portion to acclimate together;
   bonding the vinyl slab portion to the acoustical portion using an adhesive to form a bonded slab assembly;
   stacking a plurality of said bonded slab assemblies to form an assembly stack; and
   cutting each of the bonded slab assemblies into vinyl tiles of a predetermined shape and size.

2. The method of claim 1, wherein the first predetermined time period comprises about 48 hours.

3. The method of claim 1, wherein the step of storing the vinyl slab portion and the acoustical portion occurs at between 63 degrees F. and 73 degrees F.

4. The method of claim 1, further comprising:
   storing the assembly stack for at least a second predetermined time period to allow the bonded slab assemblies to equalize stress in the components prior to cutting.

5. The method of claim 4, wherein the second predetermined time period comprises about at least 48 hours.

6. The method of claim 3, wherein the step of storing the assembly stack occurs at between 63 degrees F. and 73 degrees F.

7. The method of claim 1, wherein the step of forming a vinyl slab portion comprises:
   bonding together a vinyl backing layer, a print film layer and a clear wear layer.

8. The method of claim 1, wherein the step of forming an acoustical portion comprises:
   mixing a rubber component and a polyurethane component to form a mixture; molding the mixture to form a cured roll; and
   cutting layers from the cured roll to obtain the acoustical portion.

9. The method of claim 8, wherein the mixture further comprises a resin binder.

10. The method of claim 1, wherein the acoustical slab portion comprises an elastomer.

11. The method of claim 1, wherein the acoustical slab portion comprises a mixture of crumb rubber, a polyurethane foam and a resin binder.

12. A method of making a vinyl tile comprising:
   forming a vinyl slab portion;
   forming an acoustical portion;
   bonding the vinyl slab portion to the acoustical portion using an adhesive to form a bonded slab assembly;
   stacking a plurality of said bonded slab assemblies to form an assembly stack;
   storing the assembly stack for at least a predetermined time period to allow the bonded slab assemblies to equalize stress in the components; and
   cutting each of the bonded slab assemblies into vinyl tiles of a predetermined shape and size.

* * * * *